P. MacKENZIE AND N. G. COSMAN.
CUTTER BAR FOR LAWN MOWERS.
APPLICATION FILED JUNE 6, 1921.
1,437,434.
Patented Dec. 5, 1922.
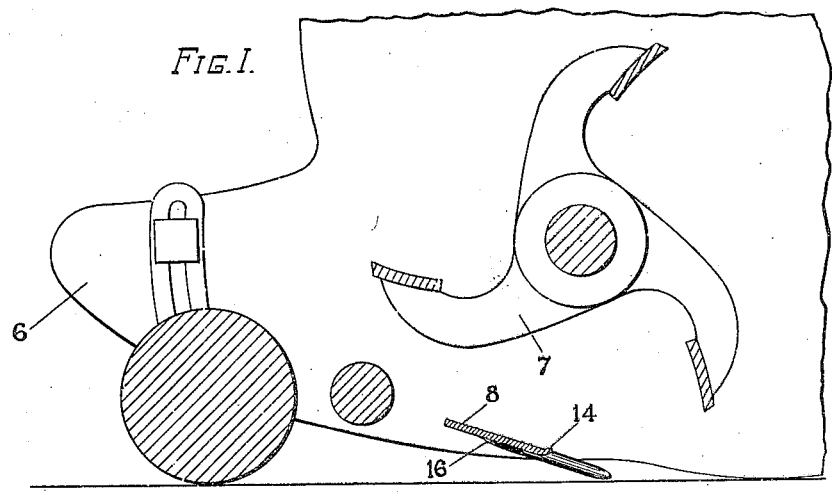
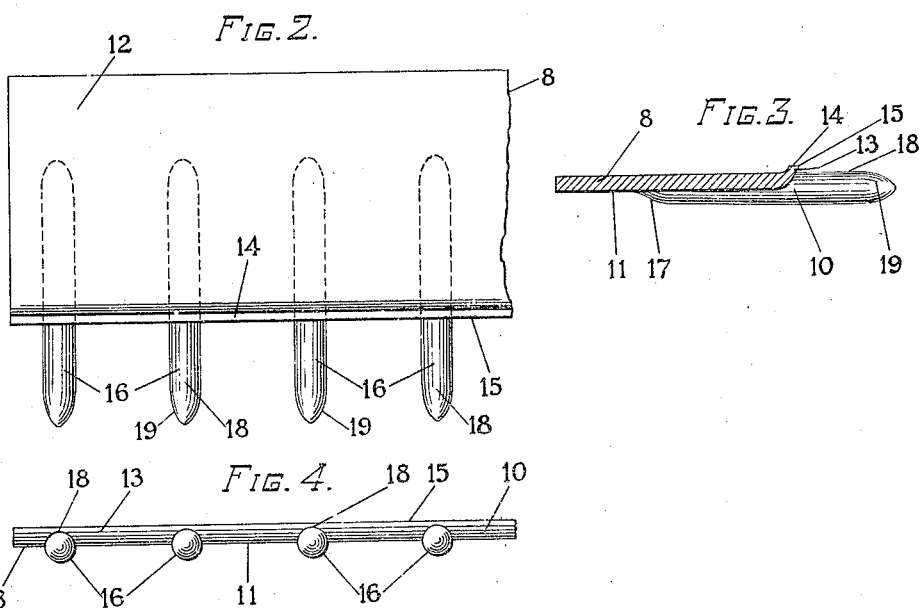
Inventors
Peter Mac Kenzie
and
Nathan G. Cosman.
By Watson E. Coleman
Attorney Patented Dec. 5, 1922.

1,437,434

UNITED STATES PATENT OFFICE.

PETER MacKENZIE AND NATHAN G. COSMAN, OF CORONADO, CALIFORNIA.

CUTTER BAR FOR LAWN MOWERS.

Application filed June 6, 1921. Serial No. 475,387.

*To all whom it may concern:*

Be it known that we, PETER MACKENZIE and NATHAN G. COSMAN, citizens of the United States, residing at Coronado, in the county of San Diego and State of California, have invented certain new and useful Improvements in Cutter Bars for Lawn Mowers, of which the following is a specification, reference being had to the accompanying drawings.

This invention relates to cutter bars and particularly to cutter bars for lawn mowers.

It is an object of the invention to provide a cutter bar of this character provided with means for raising vegetation which is disposed below the cutter bar of the lawn mower so as to bring said vegetation into engagement with the cutter bar and produce an even cut surface.

It is another object of the invention to provide a cutter bar of this character including teeth which project from the bar in spaced relation to each other, substantially below the cutting edge of the bar, so as not only to direct the low growing vegetation to the cutting edge of the bar, but to prevent interference with the cutting operation of the bar.

It is another object of the invention to provide a cutter bar of this character including a plurality of teeth which are disposed substantially in the planes parallel to the planes of the upper and lower surface of the cutter bar to prevent said teeth from coming in contact with the ground or disturbing the even surface of the lawn.

It is a further object of the invention to provide a cutter bar of this character wherein the teeth are formed integral with the bar, and not only project from said bar substantially in parallel relation thereto, but beyond and in spaced relation to the cutting edge of the bar, said cutting edge being elevated slightly above the upper surface of the bar to insure a keen cut.

It is a still further object of the invention to provide a cutter bar of this character wherein the teeth are constructed substantially round so as to prevent the accumulation of foreign matter between said teeth and the cutter bar.

With these and other objects in view the invention consists in the improved construction and arrangement of parts to be hereinafter more particularly described, fully claimed and illustrated in the accompanying drawings, in which:—

Figure 1 is a fragmentary sectional view of a lawn mower, showing the invention applied, the invention being also shown in section, Figure 2 is a fragmentary top plan view of the cutter bar, Figure 3 is a transverse sectional view of the cutter bar, and Figure 4 is a fragmentary front elevation of the cutter bar.

Referring to the drawings, 6 designates a conventional form of lawn mower including a rotating cutting member 7 of conventional form. In connection with this mechanism, a novel form of cutter bar or blade is used, said blade consisting of a strip of material 8, having its end portions provided with connecting means. The forward longitudinal edge 10 is substantially rounded, that is curved from the lower surface 11 of the strip to the upper surface 12. The upper portion of the edge 10 is provided with an extension 13 which is disposed above the upper surface 12 of the strip and forms the continuation of the curved forward edge of the strip. The upper face 14 of the extension is disposed substantially in parallel relation to the upper surface 12, and cooperates with the edge 10 to form a cutting edge 15. By this means the cutting edge is positioned in spaced relation to all other parts of the cutter bar to prevent interference in the cutting operation and insure a keen cut.

It has been found that in the use of a conventional form of lawn mower that the cutter bar or stationary blade does not come in contact with vegetation lying close to the ground, such as Bermuda grass, which will not come in contact with the cutter bar of the lawn mower unless some means are provided to raise the same from the ground, and into the path of the cutter bar. To accomplish this operation without the use of means separate from the lawn mower, and at the same time to produce an even cut lawn surface, a series of teeth 16 are provided, each tooth formed integral with the cutter bar or strip 8, and is substantially round in cross section. The rear portion 17 of each tooth inclines upwardly from the lower surface of the tooth, while the upper portion 18 of the tooth extends from the edge 10 of the strip substantially in a plane parallel to the plane of the top surface 12. It will be noted that the upper portion 18 is disposed in spaced relation to the cutting edge 15 so that it does not at any time interfere with the engagement of vegetation with the cutting bar, even at the portion of the edge disposed above the upper portion 18 of the tooth. The outer end 19 of the tooth is tapered, the apex of said tapered portion being disposed substantially in alignment with the lower edge of the cutter bar strip 8.

With this novel arrangement, the teeth do not at any time extend downwardly toward the ground so that there is no possibility of the cut surface of the lawn being formed into furrows or channels as the position of the teeth is determined by the position of the cutter bar, and yet the teeth are disposed a sufficient distance below the cutting edge of the bar to come in contact with and raise the low line of growing vegetation and directs the same toward the cutting edge of the cutting bar.

Another important feature is that in view of the fact that the tooth is substantially round in cross section, and has the same diameter from its point of projection from the strip to a point adjacent the end of the tooth, there is no danger of dirt, grass, or like matter becoming lodged between the tooth and the cutting edge, as the round surface of the tooth will serve to direct said matter to the ground. Another important feature is that by elevating the cutting edge with respect to the upper surface of the cutting bar, the teeth do not interfere with the resharpening of the edge and also permit said edge to extend uninterruptedly from one edge of the bar to the other.

From the foregoing it will be readily seen that this invention provides a novel cutter bar for lawn mowers so constructed that it may be used in connection with both manually operated and power driven lawn mowers, and which insures the cutting of all vegetation, regardless of its form or kind, as it serves to direct the vegetation toward the cutting edge and to substantially hold the vegetation while it is being cut, and all these features are possessed by a device that can be formed from a single piece of material.

What is claimed is:

A cutter bar for mowers consisting of a bar having one of its longitudinal edges substantially rounded and extended above the upper surface of the bar, the upper face of said extension being disposed substantially parallel to the upper surface of the bar, and a series of teeth formed integral with the bar and projecting beyond said edge of the bar in spaced relation to the upper face of the extension, said teeth being disposed substantially parallel to the ends of the bar.

In testimony whereof we hereunto affix our signatures.

PETER MacKENZIE.
NATHAN G. COSMAN.